United States Patent [19]
Ciboldi et al.

[11] 3,920,939
[45] Nov. 18, 1975

[54] CIRCUIT BREAKER PROTECTIVE SHUTTER APPARATUS

[75] Inventors: Pietro Ciboldi; Giulio Bellone, both of Bergamo, Italy

[73] Assignee: Magrini Galileo S.p.A., Milan, Italy

[22] Filed: Apr. 2, 1974

[21] Appl. No.: 457,265

[30] Foreign Application Priority Data
Apr. 6, 1973 Italy.................. 22652/73

[52] U.S. Cl............................. 200/50 AA; 317/103
[51] Int. Cl.²...................... H01H 9/22; H02B 1/14
[58] Field of Search.............. 200/50 AA; 317/103

[56] References Cited
UNITED STATES PATENTS

| | | | |
|---|---|---|---|
| 1,566,935 | 12/1925 | Trencham et al............... | 317/103 X |
| 2,504,775 | 4/1950 | Wood........................ | 200/50 AA X |
| 2,579,992 | 12/1951 | Wood........................ | 317/103 |
| 3,213,222 | 10/1965 | Finley et al................. | 317/103 X |
| 3,213,222 | 10/1965 | Finley et al................. | 200/50 AA |
| 3,295,025 | 12/1966 | Tjebben.................... | 200/50 AA X |
| 3,610,850 | 10/1971 | Eichelberger............... | 200/50 AA |
| 3,614,350 | 10/1971 | Eichelberger et al......... | 200/50 AA |
| 3,778,568 | 12/1973 | Wilson..................... | 200/50 AA |

FOREIGN PATENTS OR APPLICATIONS
238,226  6/1945  Switzerland....................... 317/103

Primary Examiner—James R. Scott
Attorney, Agent, or Firm—Stevens, Davis, Miller & Mosher

[57] ABSTRACT

A circuit breaker protective apparatus including a safety shutter assembly housed in the cubicle of an electric switch-board and forming a diaphragm separating front and rear sections of the cubicle; both the partition and safety shutter comprising the shutter assembly are movable horizontally with respect to the vertical rear wall of the cubicle and the shutter is also movable vertically and parallel to the partition member; the latter is provided with ports or pass-through holes corresponding to the insulated line terminal connectors and permit access thereto; the shutter is provided to shut the ports of the partition member. Movement of the partition and shutter in a predetermined sequence is controlled by means provided on the circuit breaker carriage assembly as a result of movement of the latter into and out of the electric board cubicle.

8 Claims, 3 Drawing Figures

CIRCUIT BREAKER PROTECTIVE SHUTTER APPARATUS

BACKGROUND OF THE INVENTION

The present invention relates to a protective shutter device for electrical circuit breaker cubicles. More particularly, the invention relates to a protective shutter mechanism which seals off the high voltage line terminals in the cubicle to prevent the operator from inadvertently coming into contact with them.

Cubicle-type circuit breaker structures making up electric board assemblies are known. The circuit breakers for the electric board cubicles are connected and disconnected to and from the line terminals by means of trucks which run on stationary rails and carry the circuit breaker assemblies; movement of the trucks along the rails causes the circuit breakers to be drawn into or out of their corresponding board cubicles for connection to or disconnection from the line terminal contact members.

Also known are electric board cubicles equipped with metal shutters which are automatically operated by the draw-out phase of circuit breaker operation to cover the line terminal members. The known types of shutters and associated automatic control assemblies are disadvantageous in that they are generally complicated and require that substantial additional space be allocated to the circuit breaker assembly. In fact, if both rolling and single plate shutters of the prior art type are used, the overall dimensions of the cubicles raise difficult problems with respect to the cubicle board installation due to the increase in size necessary to accommodate the shutters.

The principal object of the present invention, therefore, is to provide a compact and effective protective shutter device which ensures the safety of the system operator by shutting off access to the line terminal members upon the movable breaker assembly being drawn out of its cubicle.

A further object of the invention is to provide a protective shutter device which automatically and completely seals the line terminal members upon the circuit breaker assembly being drawn out of its cubicle to prevent the operator from inadvertently contacting exposed high voltage terminals and to thereby satisfy the requirements of safety and accident prevention rules and regulations.

A still further object lies in providing a protective shutter device which is of simple construction and which is compactly dimensioned to the extent that the overall size of the cubicle itself can be made smaller, and the depth of the cubicle in particular can be decreased, an important consideration in the design of electric board breaker assemblies.

A still further object of the invention is a protective shutter device which is simple to construct, operate and maintain and which permits the cost of manufacturing the device to be reduced in comparison with known devices.

SUMMARY OF THE INVENTION

The above and other objects of the invention will become apparent from the following detailed description of a preferred embodiment of the invention which includes a safety shutter assembly, comprising a partition member and a shutter housed in the cubicle of the electric board assembly and forming a diaphragm arrangement which separates the front and rear sections (or chambers) of the cubicle. The partition and shutter are disposed in close facing relationship to each other and are movable horizontally with respect to the vertical rear wall of the cubicle; the shutter, is also movable vertically and parallel to the partition. The latter is provided with ports or pass-through holes for access to the circuit line terminal connectors and corresponding bushing insulators; the auxiliary shutter is designed to shut the ports or pass-through holes when the movable breaker assembly is drawn out of the cubicle. The circuit breaker truck is provided with means to control the vertical movement of the shutter and the horizontal translational movement of both the partition and shutter to expose the line terminal members for connection with the breaker members when the truck is drawn into the cubicle and to seal off access to the line terminal members when the breaker truck is moved to the draw-out position.

BRIEF DESCRIPTION OF THE DRAWING

The preferred embodiment of the invention will be described in detail with reference to the appended drawing figures wherein.

DESCRIPTION OF THE PREFERRED EMBODIMENT

Figure 1:
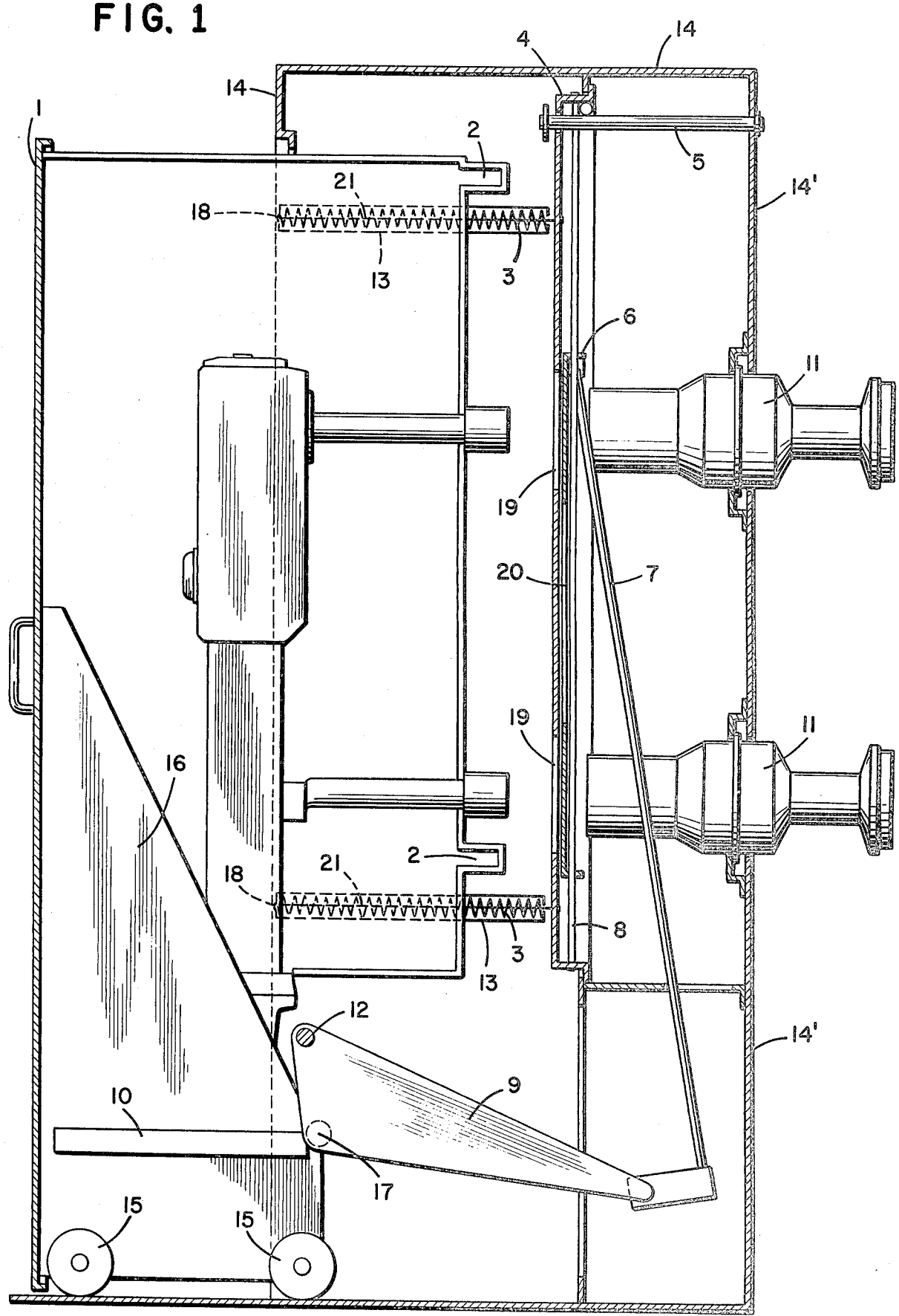
FIG. 1 shows a lateral section of the apparatus in an initial stage of operation with the circuit breaker fully drawn out and the safety shutter assembly fully closed.

The apparatus of the invention includes a stationary frame (or electric board) 14, preferably of metal construction, and having a rear panel 14' through which pass the high voltage line terminal connectors protected by bushing insulators 11. A known draw-out type of circuit breaker assembly is housed in a casing 1 mounted on a truck 16 provided with wheels 15. The breaker components themselves may be of any appropriate known type and therefore will not be described further.

Mounted on the frame 14 is a safety shutter assembly including a barrier or partition member 4 and a shutter member 6. The partition member 4 is mounted for horizontal movement along at least one, but generally two or more, support arms or guides 5 which in turn are rigidly mounted to the back panel 14'.

The shutter member 6 is movable vertically and is guided by upright members 8 fixed to top and bottom portions of the main shutter 4. By virtue of this mounting, shutter 6 moves with partition 4 as the latter is displaced horizontally in a manner to be described hereinafter.

The vertical movement of the shutter 6 is accomplished through a mechanism which includes a linkage rod 7 having one end connected to the shutter 6 and the other end thereof pivotally connected to one end of a linkage block 9; block 9 is connected to a sidewall of the frame 14 by a member 12 which defines a pivot axis about which linkage block 9 is rotatable. Pivotal movement of linkage block 9 is obtained by means of a rib member 10 fixed to the truck 16 carrying the circuit breaker elements. As the truck 16 is moved into the breaker cubicle defined by frame 14, rib 10 engages a pin 17 on linkage block 9. As truck 16 moves further into the electric board cubicle, rib 10 pushes against pin 17, thereby causing linkage block 9 to rotate in a counter-clockwise direction (relative to the position shown in FIG. 1) about pivot axis 12. The rotational movement of linkage block 9 is translated into a substantially upward vertical movement of linkage rod 7 to thereby urge auxiliary shutter 6 upwardly along the track defined by guide members 8.

The partition member 4 is, as previously noted, mounted for horizontal movement along support arms 5. In the disclosed embodiment, partition 4 is normally urged into its rest position (FIG. 1) by means of springs 3 disposed around a central rod 21 and housed in a suitable tubular casing 13 fixed at one end 18 to the frame 14 and having an opening at the other end through which rod 21 projects for connection to the partition 4. In its initial or rest position, the partition 4 is located in front of the insulator-protected line terminals to separate the main cubicle space from the terminal contact space. Access to the terminal connectors is obtained through corresponding openings 19 in partition 4. Openings 19 are large enough to clear the bushings 11 when the shutter assembly is moved to its rearmost position against rear wall 14'.

Figure 2:
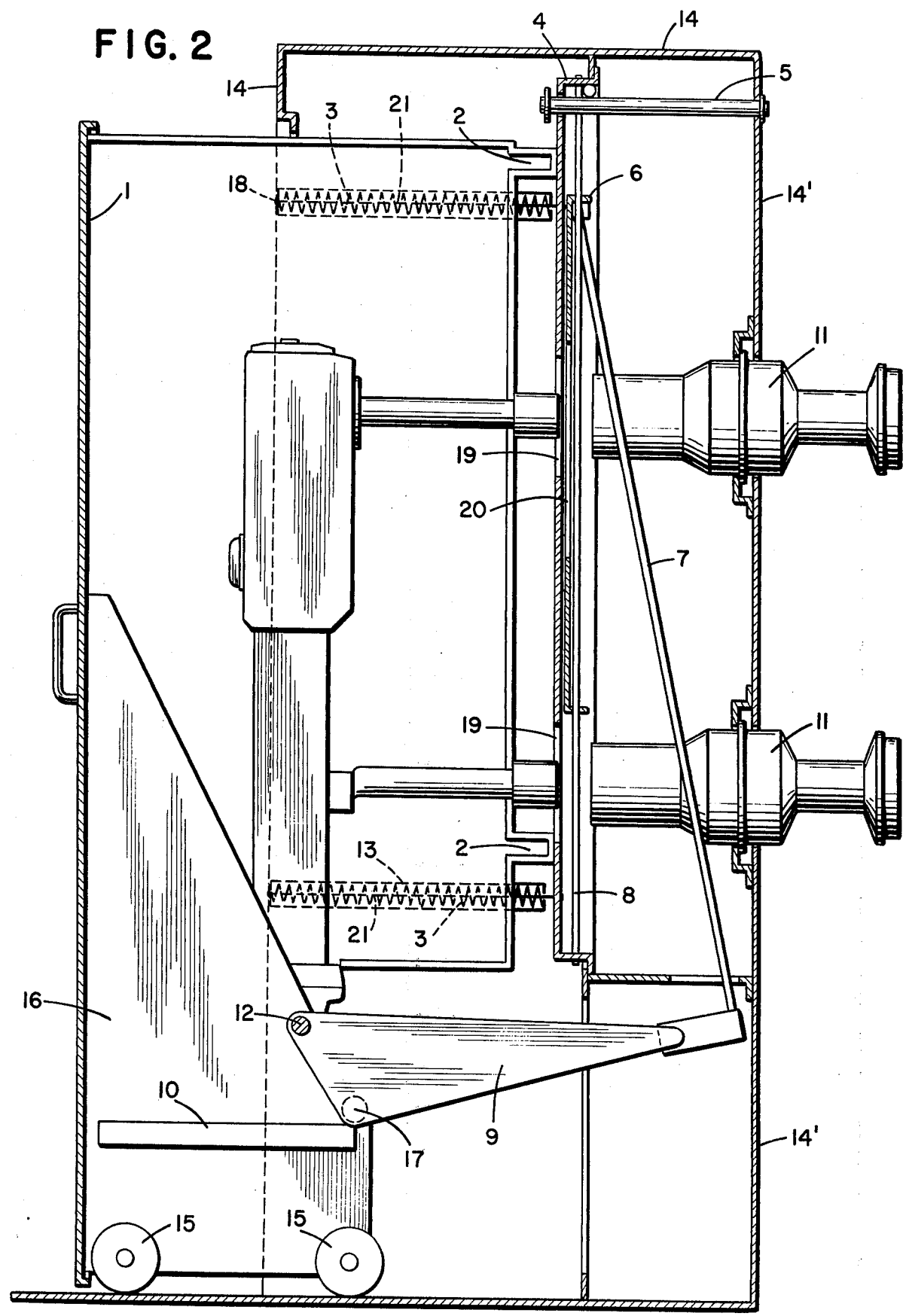
FIG. 2 shows a lateral section of the apparatus in an intermediate stage with the circuit breaker partially drawn in and the shutter in its raised or non-sealing position.

In the full draw-out position of the breaker assembly (FIG. 1), shutter 6, located in its lowermost position, covers openings 19 in partition 4 to prevent access to the line contact terminals. Shutter 6 has at least one opening 20 so that in the intermediate draw-out position of the breaker assembly (FIG. 2), with shutter 6 at its uppermost position, opening 20 coincides with the upper opening 19 of partition 4 to permit access to the upper line terminal 11; the bottom of shutter 6 is raised sufficiently to expose the lowermost opening 19 of shutter 4 to thereby permit access to the lower line terminal 11. In a minor modification, shutter 6 could be made longer and provided with a second opening 20 coinciding with lower opening 19 of partition 4 in the raised position of shutter 6.

Figure 3:
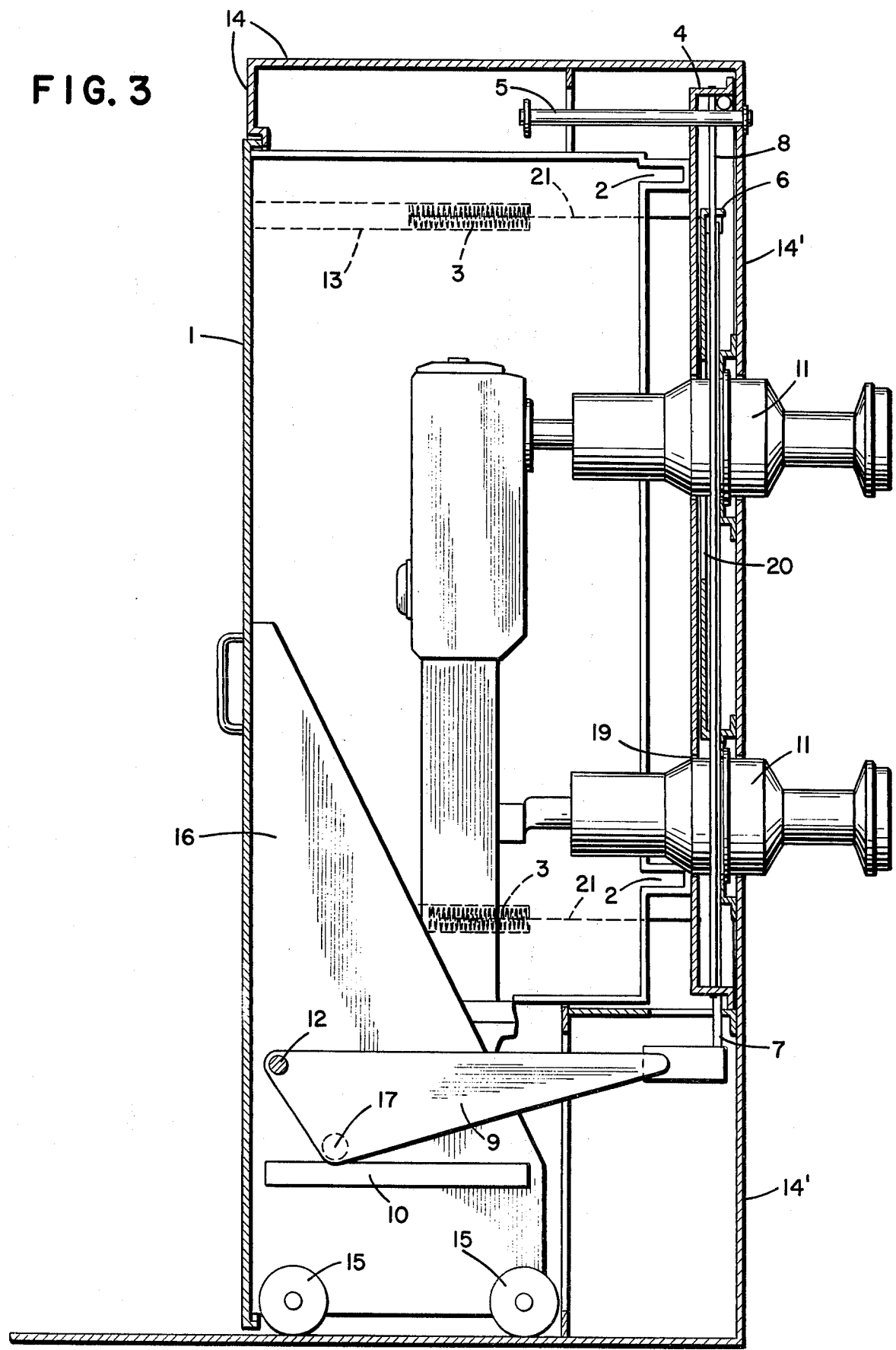
FIG. 3 shows a lateral section of the apparatus in the final stage with the circuit breaker fully drawn in and connected to the line terminal members, the partition and safety shutter being fully open and at the ends of their respective travel.

Breaker housing 1 includes pressing members 2 either integrally formed therewith or fixed thereto in a known manner; members 2 contact partition 4 as the breaker housing 1 is drawn into the cubicle in frame 14. As the breaker assembly 1 moves into the cubicle toward the full draw-in position, members 2 press against partition 4 until, in the fully drawn-in position (FIG. 3), partition 4 and shutter 6 are disposed adjacent the rear panel 14'; shutter 6 is maintained in its raised position by the engagement of rib 10 against pin 17, preventing clockwise rotation of the linkage block 9.

In the draw-out operation, as the breaker assembly 1 is moved out of the cubicle in frame 14, the energy stored in compressed springs 3 acts against the rod 21 to thereby urge the partition 4 and entire shutter assembly toward its rest position at the end of travel defined by the length of support arms 5. The assembly then returns to the intermediate position (FIG. 2) and it can be seen that the line terminals are separated by the partition 4 from the main cubicle area even before the operator has access to the cubicle.

As the breaker truck 16 is moved still further out of the electric board cubicle, rib 10 becomes disengaged from pin 17, thereby permitting linkage block 9 to rotate about axis 12 and permit shutter 6 to drop into place covering openings 19 in partition 4. Thus by the time sufficient clearance is obtained to permit access by the operator to the cubicle, the line terminals are completely sealed off and the operator is thereby protected from inadvertent exposure to the high voltage normally appearing across these terminals. If the shutter 6 is sufficiently heavy, then the return operation to its lowermost position when the truck 16 is drawn out of the cubicle can be achieved by the force of gravity; a positive return can be obtained by locating return springs about the guides 8 between the top of partition 6 and the underside of the top of shutter 4.

It is possible to define three stages of operation of this invention: a first or initial stage wherein the circuit breaker is fully disconnected, the partition and shutter are in their rest position (the cubicle is consequently fully divided in two distinct sections) and, in particular, the shutter is in its lower position; a second or intermediate stage just prior to connection of the circuit breaker with the line terminals, wherein the partition is still in its rest position, while the shutter is in its upper position to allow the breaker terminals free access to the line terminals; and a third or final stage, wherein the circuit breaker is fully connected to the line terminals and the partition and shutter are both located in their positions of maximum horizontal translation, the shutter also being held in its upper position. The apparatus of this invention achieves the advantages of extreme simplicity and high service safety: the full drawing out of the circuit breaker is possible only when both the partition and shutter have reached their fully closed positions. Even when circuit breaker 1 is fully disconnected from the line terminals but not completely drawn out of board cubicle 14 (FIG. 1), the shutter 4 will already have reached its rest position, thus clearly separating the live chamber of the cubicle (containing the line terminals) from the section within the operator's reach; further access to the cubicle can be had only after circuit breaker 1 has been completely drawn out and removed from the board cubicle. This guarantees that no live member can accidentally remain uncovered, an unintentional manual opening of the shutter assembly being impossible. Obviously, means can be provided to manually open the shutter assembly to permit intentional access to the line terminals in order to allow for any necessary repair work to be performed thereon.

As an alternative to the above-described embodiment, the partition 4, and breaker assembly 1, could be provided with an automatic latch and trip device suitable for joining or releasing circuit breaker 1 with or from partition 4 to permit the latter to return to its rest position, i.e. protection position (FIG. 1), due to the action of the latch and trip device. Also, return springs 3 could be directly connected to partition 4 and frame 14 and utilized as expansion, rather than compression, springs.

Further minor modifications of the disclosed embodiment could be had by duplicating rib 10, link block 9, and connecting rod 7 on the other side of the breaker carriage to assure better operation of the shutter 6. Also, pin 17 can be substituted by a roller or, more simply, by the crank the linkage block 9 presents with pin 17, and which can be suitably shaped to slide on rib 10 just like a roller or a pin.

It is to be understood that various modifications in the structural details of the preferred embodiment described herein may be made within the scope of this invention and without departing from the spirit thereof. It is intended that the scope of this invention shall be limited solely by the hereafter appended claims.

What is claimed is:

1. A protective apparatus for electric board cubicle circuit breaker assemblies having a frame including at least rear and side walls defining a cubicle therebetween, means mounting high voltage line terminals on said rear wall such that said terminals extend at least partially into said cubicle, and a movable circuit breaker housing movable into and out of said cubicle and having contact members located thereon which mate with said line terminals when said housing is fully drawn into said cubicle, said protective apparatus comprising:

a protective shutter assembly, including a partition member located in said cubicle and having openings therein corresponding to the locations of said line terminals in said cubicle and a shutter member mounted on said partition member and horizontally movable therewith;

means mounting said shutter assembly in said cubicle for substantially horizontal movement toward and away from said rear wall between first and second positions, wherein, in said first position said shutter assembly is spaced from said rear wall a distance greater than the distance said line terminals extend into said cubicle from said rear wall, and wherein, in said second position said shutter assembly is located adjacent said rear wall such that said line terminals project through said openings in said partition member;

means for moving said shutter member substantially vertically between closed and open positions, wherein in said closed position, said shutter member covers said openings in said partition member to prevent access to said line terminals and in said open position, said shutter member uncovers said openings in said partition member to permit access to said line terminals; and means provided on said movable housing for moving said shutter assembly between said first and second positions and for moving said shutter member between said closed and open positions.

2. The protective apparatus according to claim 1, wherein said shutter member comprises a substantially planar member having at least one opening therein, said one opening being located in said planar member to coincide with a corresponding opening in said partition member when said shutter member is located in its open position, and to be out of coincidence with said corresponding opening in said first shutter when said shutter member is in its closed position.

3. The protective apparatus according to claim 1, further comprising:

vertical support members fixed to said partition member, said shutter member being mounted on said support members for movement therealong;

a linkage member pivotally mounted on said frame; and means coupling said linkage member to said shutter member to translate a pivotal movement of the former into a substantially vertical movement of the latter between said closed and open positions.

4. The protective apparatus according to claim 3, further comprising:

first control means mounted on said movable housing for engagement with said linkage member to pivot said linkage member about its pivot axis and urge said shutter from its closed to its open position when said housing is moved into said cubicle; and second control means mounted on said movable housing for engagement with said shutter assembly to urge said shutter assembly toward its second position when said housing is moved into said cubicle.

5. The protective apparatus according to claim 4, wherein said second control means comprises pressing feet mounted on said movable housing and located on said housing to engage said shutter assembly only after said shutter member has been moved to its open position by said first control means.

6. The protective apparatus according to claim 4, wherein said first control means comprises an elongated rib member fixed to said movable housing, said rib member engaging said linkage member and holding said linkage member in a pivoted position to hold said shutter member in its open position as long as said housing is located in said cubicle.

7. The protective apparatus according to claim 1, further comprising bias means coupled to said shutter assembly and urging said shutter assembly constantly in the direction of said first position and against the force applied to said shutter assembly by said moving means provided on said housing.

8. The protective apparatus according to claim 7, wherein said bias means comprises a tubular casing fixed to said frame, a rod mounted to said partition member and extending into said casing, and spring means contained in said casing and engaging said rod to urge said rod and said partition in the direction of said first shutter assembly position.

* * * * *